(12) United States Patent
Lin

(10) Patent No.: US 8,192,038 B2
(45) Date of Patent: Jun. 5, 2012

(54) PHOTOGRAPHIC REFLECTOR

(75) Inventor: Chien-Ting Lin, Santa Fe Springs, CA (US)

(73) Assignee: Linco Inc., Santa Fe Springs, CA (US)

( * ) Notice: Subject to any disclaimer, the term of this patent is extended or adjusted under 35 U.S.C. 154(b) by 0 days.

(21) Appl. No.: 13/191,587

(22) Filed: Jul. 27, 2011

(65) Prior Publication Data

US 2012/0026717 A1   Feb. 2, 2012

(30) Foreign Application Priority Data

Jul. 27, 2010  (CN) .......................... 2010 2 0272228

(51) Int. Cl.
*G03B 15/02* (2006.01)
(52) U.S. Cl. ................ 362/18; 362/16; 362/17
(58) Field of Classification Search .................... 362/11, 362/16–18, 319, 320, 346, 347, 351, 355, 362/358, 361
See application file for complete search history.

(56) References Cited

U.S. PATENT DOCUMENTS

| | | | | |
|---|---|---|---|---|
| 4,757,425 A | * | 7/1988 | Waltz | 362/18 |
| 5,841,146 A | * | 11/1998 | Briese | 250/493.1 |
| 6,030,087 A | * | 2/2000 | Whittle | 362/18 |
| 7,063,428 B2 | * | 6/2006 | Lowe | 362/18 |

FOREIGN PATENT DOCUMENTS

CH          645735 A * 10/1984
* cited by examiner

*Primary Examiner* — Hargobind S Sawhney
(74) *Attorney, Agent, or Firm* — Lin & Associates IP, Inc.

(57) ABSTRACT

A photographic reflector includes an engagement unit, a support frame, a fabric canopy, and a lamp holder. The engagement unit includes an engagement seat and an engagement member moveably mounted in the engagement seat. The support frame includes a plurality of ribs and a plurality of stretchers corresponding to each respective rib. One end of each rib is pivotally connected to the engagement seat. One end of each stretcher is pivotally connected to a preset location of the corresponding rib, and the other end of each stretcher is pivotally connected to the engagement member. The fabric canopy is mounted on the ribs of the support frame and has a reflective layer at an inside thereof and a mounting hole defined at a location close to the engagement unit. The lamp holder is mounted in the mounting hole of the fabric canopy. The photographic reflector can be folded as compactly as desired, easily stored, and convenient in transportation and use.

4 Claims, 5 Drawing Sheets

PHOTOGRAPHIC REFLECTOR

BACKGROUND OF THE INVENTION

1. Field of the Invention

The present invention relates to a lamp reflector, and more particular to a photographic reflector for use in photography.

2. The Prior Arts

In photographing, radio and television, movie making, and live broadcast industries, many photographing, image capturing, and illuminating apparatuses are required. In order to direct light towards a specific direction or area for achieving the required level of illumination, a photographic reflector is often used in photographing. Conventional photographic reflectors generally can not be folded as compactly as desired, which occupy a large storage space and are inconvenient in transportation and use.

Therefore, it is desired to provide an improved photographic reflector.

SUMMARY OF THE INVENTION

A primary objective of the present invention is to provide a photographic reflector that can be folded as compactly as desired, easily stored, and convenient in transportation and use.

In order to achieve the aforementioned objective, a photographic reflector in accordance with the present invention comprises an engagement unit, a support frame, a fabric canopy, and a lamp holder. The engagement unit includes an engagement seat and an engagement member moveably mounted in the engagement seat, wherein the engagement member is capable of making a relative back-and-forth movement with respect to the engagement seat and being engaged and fastened at a preset location of the engagement seat. The support frame includes a plurality of ribs and a plurality of stretchers corresponding to each respective rib. One end of each rib is pivotally connected to the engagement seat. One end of each stretcher is pivotally connected to a preset location of the corresponding rib, and the other end of each stretcher is pivotally connected to the engagement member. When the engagement member is moved back-and-forth relative to the engagement seat, each stretcher pushes or pulls the corresponding rib for controlling the support frame to be in a folded or unfolded state. The fabric canopy is mounted on the ribs of the support frame. The fabric canopy has a reflective layer at an inside thereof and a mounting hole defined at a location close to the engagement unit. The lamp holder has a central hole and at least a lamp mounting portions for mounting a lamp. The lamp holder is mounted in the mounting hole of the fabric canopy, and the engagement unit is disposed through the central hole of the lamp holder. When the support frame is in an unfolded state, the photographic reflector presents a symmetrical polygonal shape, and the reflective layer of the fabric canopy reflects light emitted from lamps mounted in the lamp mounting portions of the lamp holder towards a specific direction or area.

With the technical solution provided by the present invention, except for the advantages of quick assembling and convenience in operation, the photographic reflector of the present invention can be folded while not in use, thereby occupying less space and providing convenience in storage and transportation.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
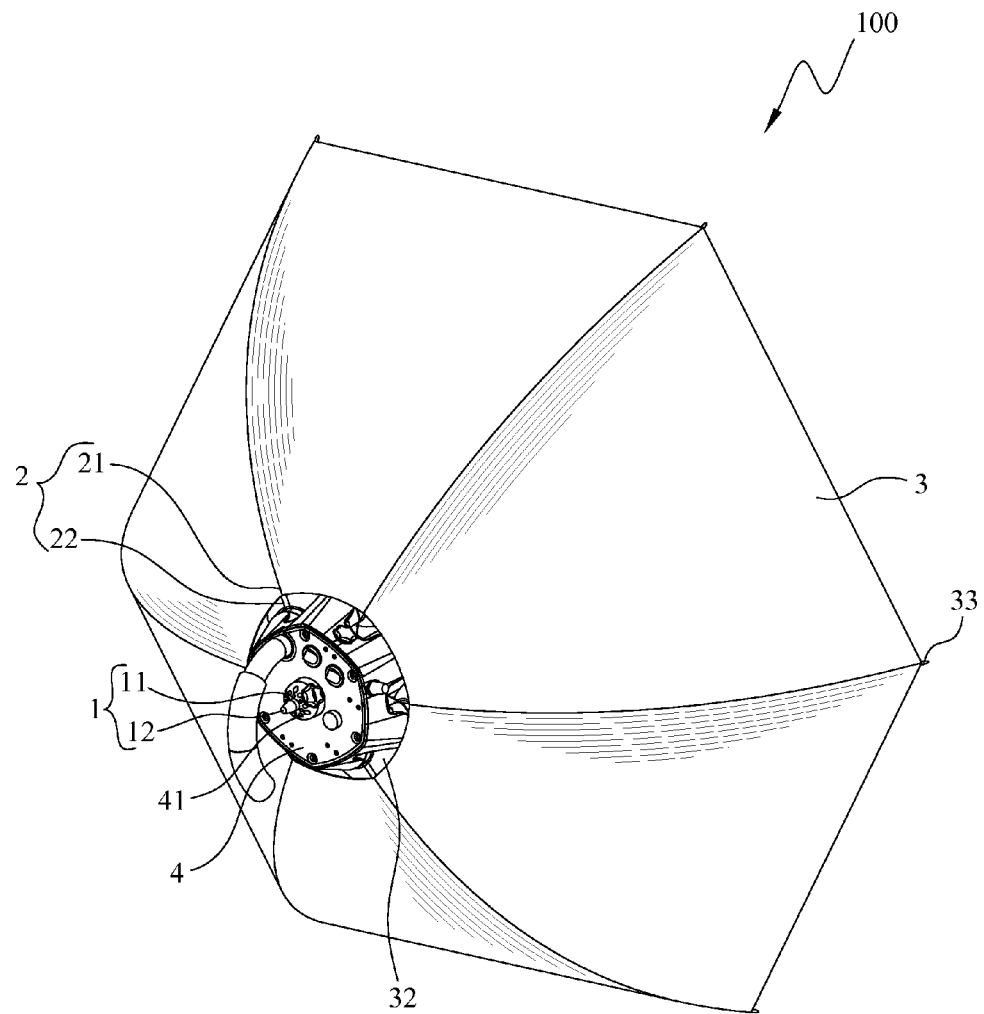
FIG. 1 is a perspective view showing an outside of a photographic reflector according to an embodiment of the present invention.
Figure 2:
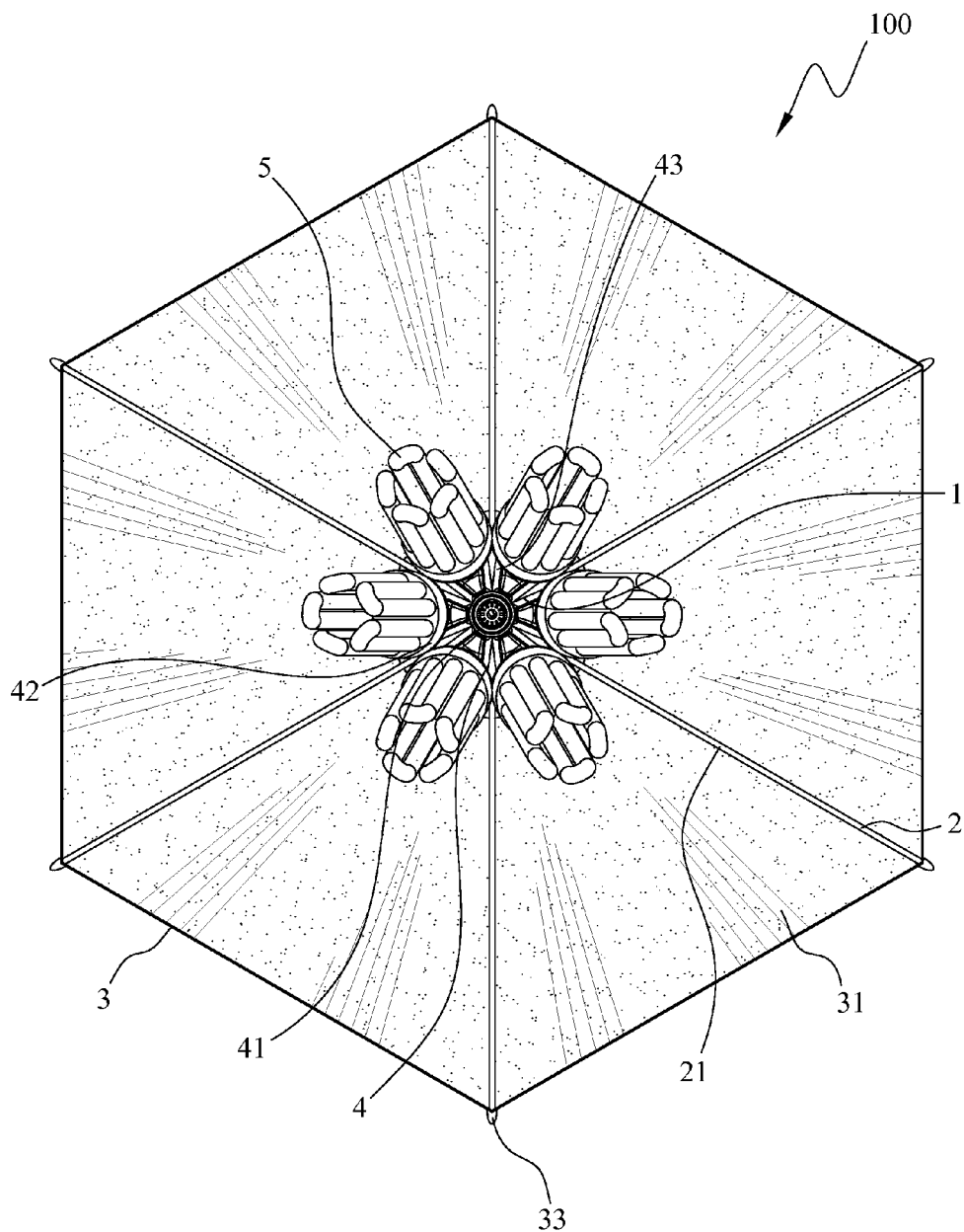
FIG. 2 is a perspective view showing an inside of the photographic reflector of the present invention.

Please refer to FIG. 1 and FIG. 2. FIG. 1 is a perspective view showing an outside of a photographic reflector according to an embodiment of the present invention, and FIG. 2 is a perspective view showing an inside of the photographic reflector of the present invention. A photographic reflector 100 according to an embodiment of the present invention comprises an engagement unit 1, a support frame 2, a fabric canopy 3, and a lamp holder 4.

The engagement unit 1 includes an engagement seat 11 and an engagement member 12 moveably mounted in the engagement seat 11. The engagement member 12 is capable of making a relative back-and-forth movement with respect to the engagement seat 11 and being engaged and fastened at a preset location of the engagement seat 11. In this embodiment, the structure of the engagement unit 1 is provided for illustrative purposes only, but not limited thereto. Other structures having the same function can also be adopted for replacements.

The support frame 2 includes a plurality of ribs 21 and a plurality of stretchers 22 corresponding to each respective rib 21. One end of each rib 21 is pivotally connected to the engagement seat 11. One end of each stretcher 22 is pivotally connected to a preset location of the corresponding rib 21, and the other end of each stretcher 22 is pivotally connected to the engagement member 12. When the engagement member 12 is moved back-and-forth relative to the engagement seat 11, each stretcher 22 pushes or pulls the corresponding rib 21 for controlling the support frame 2 to be in a folded or unfolded state. In this embodiment, the connection relationship between the ribs 21 and the stretchers 22 is provided for illustrative purposes only, but not limited thereto. Other different connection relationship can also be designed according to actual needs. For example, the connected location of the stretchers 22 with the ribs 21 can be adjusted to be close to or far away a center of the engagement unit 1, thereby saving labor for operation. Moreover, the quantity of the rib 21 and the stretcher 22 can also be properly adjusted according to structural stability requirement and element cost.

The fabric canopy 3 is mounted on the ribs 21 of the support frame 2. The fabric canopy 3 has a reflective layer 31 at an inside thereof, a mounting hole 32 defined at a location close to the engagement unit 1, and a plurality of sleeves 33 at radially distal ends of the fabric canopy each for connecting to the other end of the corresponding rib 21. The material of the fabric canopy 3 is preferably a thermal-resistant polymer.

The lamp holder 4 has a central hole 41 and at least a lamp mounting portions 42 for mounting a lamp. The lamp holder 4 is mounted in the mounting hole 32 of the fabric canopy 3, and the engagement unit 1 is disposed through the central hole 41 of the lamp holder 4. A groove 43 is defined between two adjacent lamp mounting portions 42 for receiving the corresponding rib 21 and the corresponding stretcher 22 of the support frame 2. In this embodiment, the structure of the lamp holder 4 is provided for illustrative purposes only, but not limited thereto. Other shaped structures can also be adopted for replacements according to the assembled requirements with the support frame 2 and lamps.

When the support frame 2 is in an unfolded state, the photographic reflector 100 presents a symmetrical polygonal shape. The reflective layer 31 of the fabric canopy 3 can reflect light emitted from lamps 5 mounted in the lamp mounting portions 42 of the lamp holder 4 towards a specific direction or area. The lamp 5 can be, but not limited to, a halogen lamp, incandescent lamp, fluorescent lamp, or light emitting diode (LED). The shape of the lamp may be, but not limited to, a spherical, spiral, bulb, or tube shape.

Figure 3:
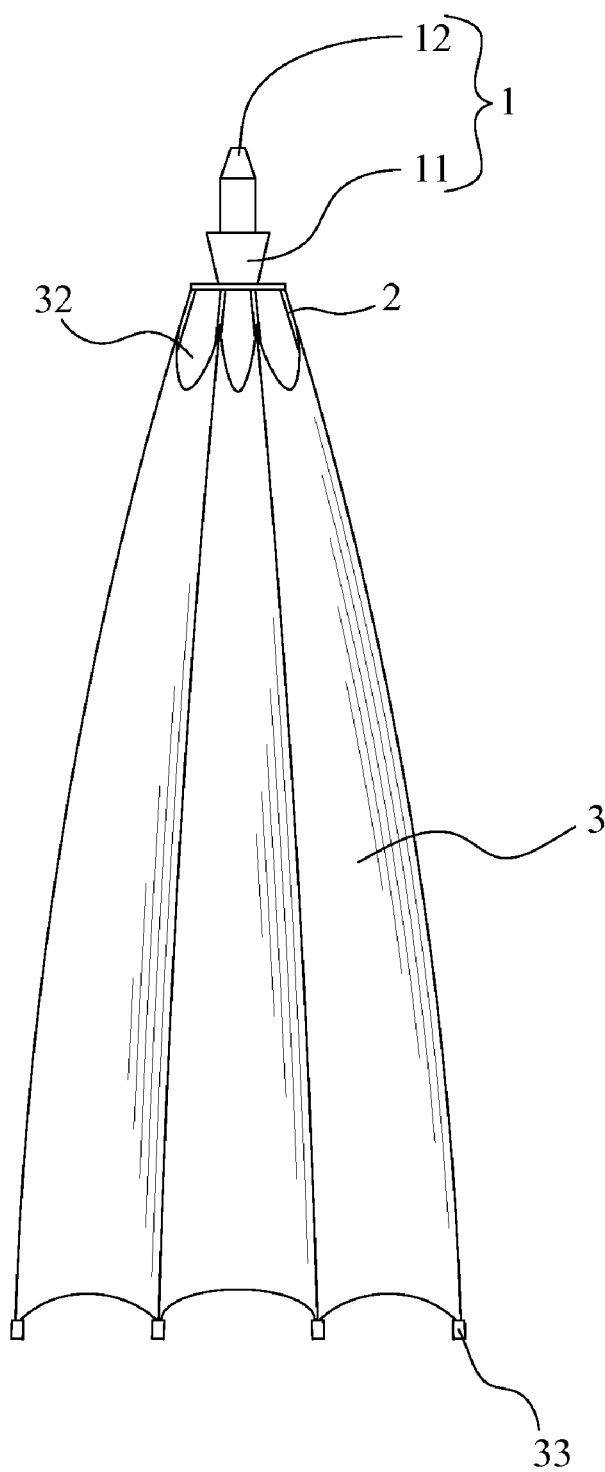
FIG. 3 is a schematic view showing that the photographic reflector of the present invention is in a folded state.
Figure 4:
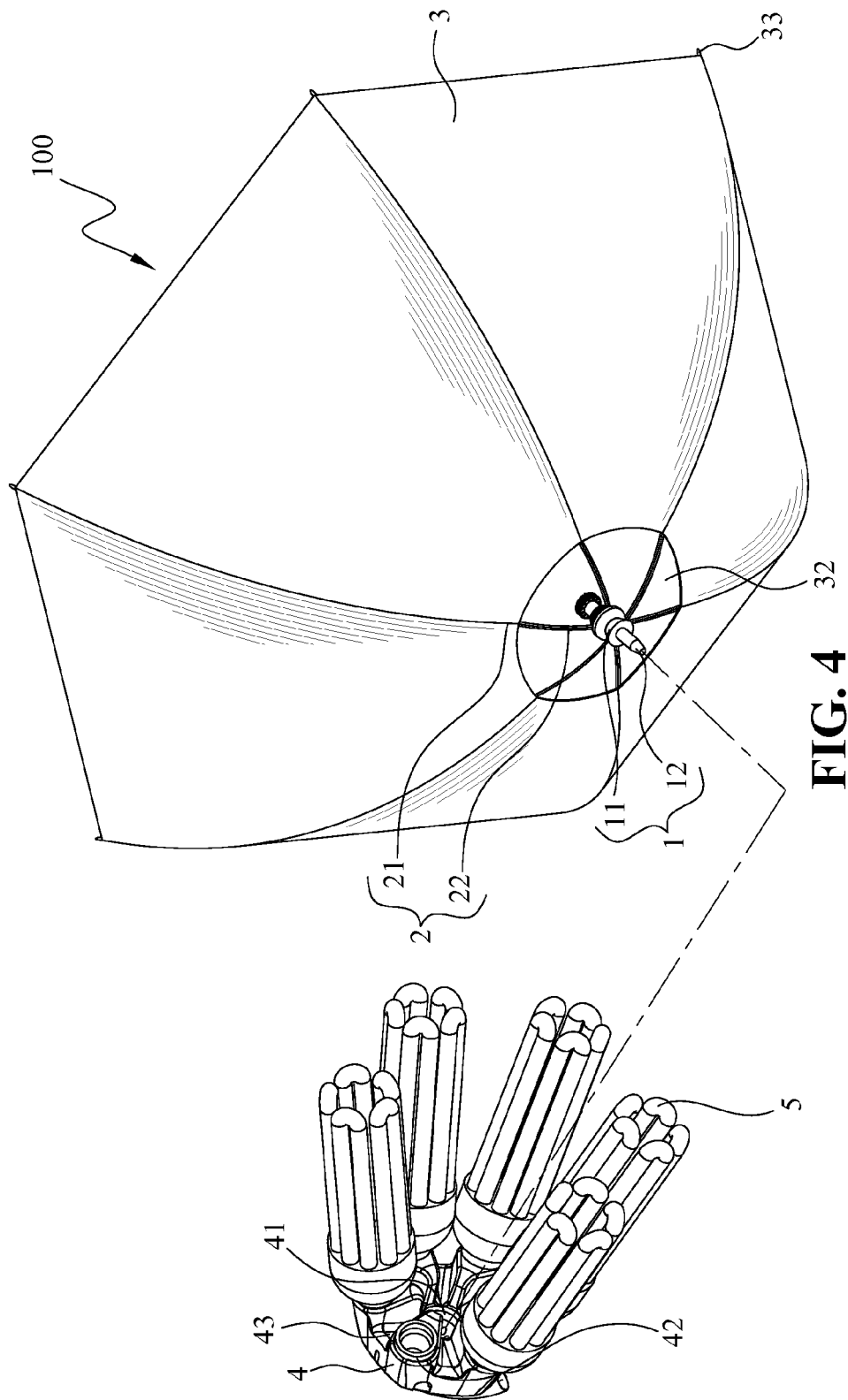
FIG. 4 is a schematic view showing that the photographic reflector of the present invention is in an unfolded state.

Please refer to FIG. 3 and FIG. 4, which show the photographic reflector of the present invention is in a folded state and an unfolded state, respectively. While not in use, the photographic reflector of the present invention can be folded, thereby occupying less space and providing convenience in storage and transportation.

As shown in FIG. 4, while in use, the user needs to outwardly pull the engagement member 12 relative to the engagement seat 11 of the engagement unit 1 to expand the support frame 2 and the fabric canopy 3 to be in an unfolded state. Because the engagement member 12 has a protrusion, the engagement member 12 can be engaged and fastened on the engagement seat 11, so as to enable the whole structure to be kept in an unfolded state. Subsequently, the lamp holder 4 is installed in the mounting hole 32, and the engagement unit 1 is disposed through the central hole 41 of the lamp holder 4.

Figure 5:
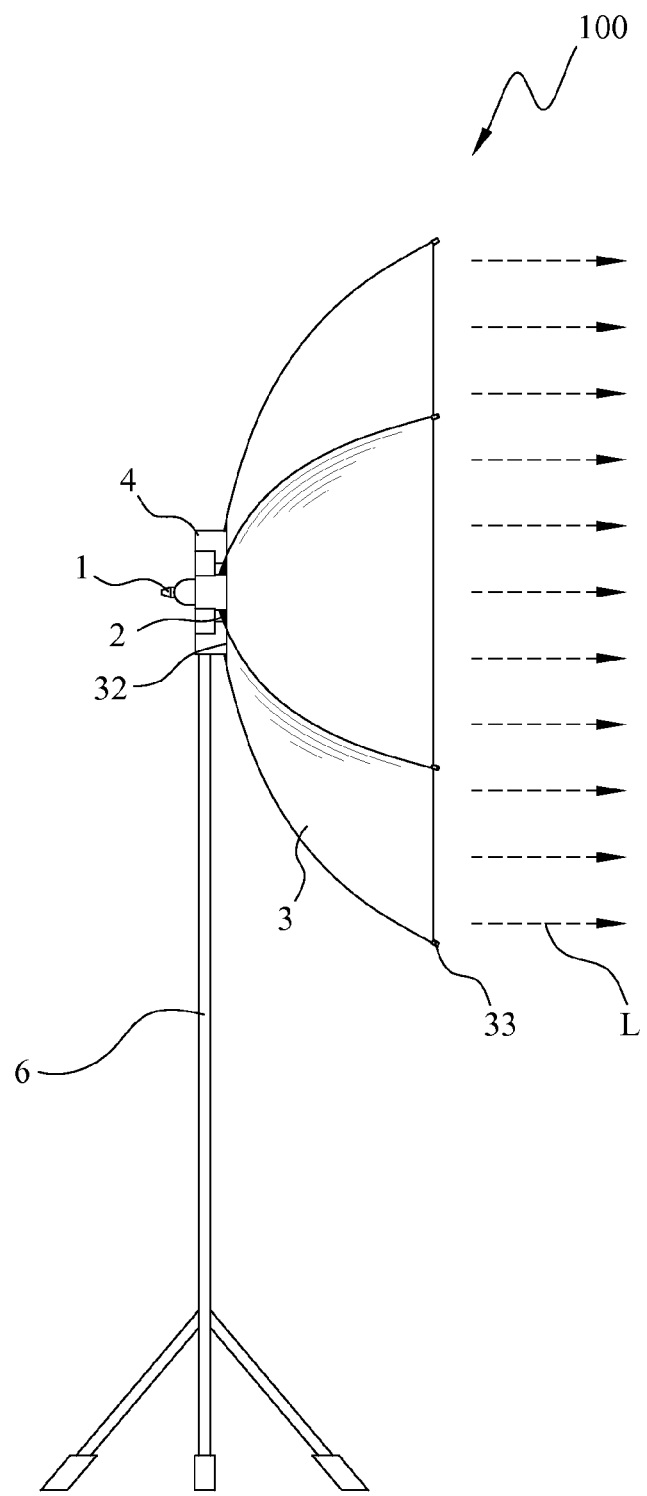
FIG. 5 is a schematic view showing that the photographic reflector of the present invention is mounted on a stand.

Please refer to FIG. 5, which is a schematic view showing that the photographic reflector of the present invention is mounted on a stand 6. The reflective layer 31 of the fabric canopy 3 reflects light emitted from the lamps mounted in the lamp mounting portions 42 of the lamp holder 4 towards a specific direction or area.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A photographic reflector comprising:
   an engagement unit including an engagement seat and an engagement member moveably mounted in the engagement seat, wherein the engagement member is capable of making a relative back-and-forth movement with respect to the engagement seat and being engaged and fastened at a preset location of the engagement seat;
   a support frame including a plurality of ribs and a plurality of stretchers corresponding to each respective rib, one end of each rib being pivotally connected to the engagement seat, one end of each stretcher being pivotally connected to a preset location of the corresponding rib and the other end of each stretcher being pivotally connected to the engagement member, wherein when the engagement member is moved back-and-forth relative to the engagement seat, each stretcher pushes or pulls the corresponding rib for controlling the support frame to be in a folded or unfolded state;
   a fabric canopy, mounted on the ribs of the support frame and having a reflective layer at an inside thereof and a mounting hole defined at a location close to the engagement unit; and
   a lamp holder having a central hole and at least a lamp mounting portions each for mounting a lamp, the lamp holder being mounted in the mounting hole of the fabric canopy, and the engagement unit being disposed through the central hole of the lamp holder,
   wherein when the support frame is in an unfolded state, the reflective layer of the fabric canopy reflects light emitted from the lamps mounted in the lamp mounting portions of the lamp holder towards a specific direction or area.

2. The photographic reflector according to claim 1, wherein a groove is defined between two adjacent lamp mounting portions for receiving the corresponding rib and stretcher of the support frame.

3. The photographic reflector according to claim 1, wherein the fabric canopy includes a plurality of sleeves at radially distal ends thereof each for connecting to the other end of the corresponding rib.

4. The photographic reflector according to claim 1, wherein the lamp is a halogen lamp, incandescent lamp, fluorescent lamp, or light emitting diode (LED).

* * * * *